United States Patent [19]
Arrowsmith et al.

[11] Patent Number: 6,057,757
[45] Date of Patent: *May 2, 2000

[54] METHOD AND APPARATUS FOR POLICY-BASED ALARM NOTIFICATION IN A DISTRIBUTED NETWORK MANAGEMENT ENVIRONMENT

[75] Inventors: Russell Arrowsmith, Merrimack, N.H.; William Tracy, Chelmsford, Mass.

[73] Assignee: Cabletron Systems, Inc., Rochester, N.H.

[*] Notice: This patent is subject to a terminal disclaimer.

[21] Appl. No.: 09/110,564

[22] Filed: Jul. 6, 1998

Related U.S. Application Data

[63] Continuation of application No. 08/412,955, Mar. 29, 1995, Pat. No. 5,777,549.

[51] Int. Cl.[7] .................................................. G08B 29/00
[52] U.S. Cl. ................. 340/506; 364/514 B; 364/514 C; 364/551.01; 364/572; 395/183.01; 395/183.22; 395/183.15; 395/185.01
[58] Field of Search ............................... 340/506, 825.06; 364/514 B, 514 C, 551.01, 572; 395/155, 156, 157, 158, 159, 160, 161

[56] References Cited

U.S. PATENT DOCUMENTS 5,261,044  11/1993  Dev et al. ................................. 395/195

OTHER PUBLICATIONS

Terplan, Communications Networks Management, "Fault Management," (Chapter 8, pp. 263–366), Second edition, Prentice Hall, Englewood Cliffs, New Jersey 07632 (1992).

Sloman, Network and Distributed Systems Management, Addison–Wesley Publishing Company, Wokingham, England (1994), "Domains: A Framework For Structuring Management Policy" (Chapter 16, pp. 433–453), Moffett, "Specification of Management Policies and Discretionary Access Control," (Chapter 17, pp. 455–480).

Ericson et al., Expert Systems Applications In Integrated Network Management, "Fault Management Applications," (Chapter 5, pp. 235–273), Artech House, 685 Canton Street, Norwood, MA 02062 (1989).

Weis, Journal of Network and Systems Management, Plenum Publishing Corp., "Policies In Network And Systems Management—Formal Definition And Architecture," Plenum Publishing Corp., (1994).

Roos et al., Integrated Network Management III, "Modelling Management Policy Using Enriched Managed Objects," Elsevier Science Publishers, North holland, pp. 207–215 (1993).

*Primary Examiner*—Jeffery A. Hofsass
*Assistant Examiner*—Daryl C. Pope
*Attorney, Agent, or Firm*—Wolf, Greenfield & Sacks, P.C.

[57] ABSTRACT

Apparatus and method for receiving alarms from multiple network management servers and applying a plurality of policy-based filters to the alarms. The filters may be named and stored in a database, and application of the policy-based filters may be scheduled for different times. The same policy-based filters may be applied to one or more multiple network management applications. The invention allows greater control over which alarms get reported to network management applications and provides a means to ensure consistency of reported alarms across multiple network management applications.

20 Claims, 9 Drawing Sheets

METHOD AND APPARATUS FOR POLICY-BASED ALARM NOTIFICATION IN A DISTRIBUTED NETWORK MANAGEMENT ENVIRONMENT

This application is a continuation of application Ser. No. 08/412,955 filed Mar. 29, 1995, now U.S. Pat. No. 5,777,549 entitled METHOD AND APPARATUS FOR POLICY-BASED ALARM NOTIFICATION IN A DISTRIBUTED NETWORK MANAGEMENT ENVIRONMENT, and now pending.

FIELD OF THE INVENTION

The present invention relates to alarm notification in a communications network and more specifically to a method and apparatus for receiving alarms from multiple network management servers, applying policies to those alarms and forwarding the alarms that conform to the policies to one or more network management applications.

BACKGROUND OF THE INVENTION

Spectrum™ is a model-based network management system, sold by Cabletron Systems, Inc., Rochester, N.H., for maintaining and processing information pertaining to the condition of a communications network and providing the same to a user. For example, Spectrum™ will periodically poll a network device to request information, such as the number of packets sent on the network in a given time and the number of errors that occurred. If the error rate is above a predetermined limit, an error alarm is logged in the Spectrum™ database, an alarm sent to the user interface to notify the network manager, and a message is sent to shut off the corresponding network device.

Alternatively, if no response was received from the network device when it was polled, the reason for the loss of contact should be determined so that appropriate action, such as a service call, can be taken. In a network environment, loss of contact with a network device may be due to failure of that network device or to failure of another network device that is involved in the transmission of a message.

In many prior art network management systems, the network administrator was typically provided with a list of possible causes of a fault and was required to isolate the fault based on his experience and knowledge of the network. In Spectrum™, the system itself isolates network defaults using a technique known as Status Suppression. Spectrum™ maintains a database of models for each network device. When contact between a model and its corresponding network device is lost, the model sets a fault status and initiates the fault isolation technique. The model (first model) which lost contact with its corresponding network device (first network device) determines whether adjacent models have lost contact with their corresponding network devices; adjacent network devices are defined as those which are directly connected to a specified network device. If adjacent models cannot contact the corresponding network devices, then the first network device cannot be the cause of the fault, and its fault status in the first model will be overriden. By suppressing the fault status of the network devices which are determined not to be defective, the defective network device can be identified. Once the fault has been isolated, the condition of the defective device can be updated in the Spectrum™ database, a control message can be sent shutting off the defective device, and the network administrator can be notified via the user interface.

Spectrum™'s associated SpectroGRAPH™ user interface provides a graphical view into the network models. An alarm log view, shown in FIG. 1, includes an area 120 for the listing of current alarms, and an area 122 for displaying information pertaining to a selected alarm. The user may click on a particular alarm in the listing of current alarms to obtain more information. A multi-function icon 124 representing the network device having a fault is displayed in area 122, with one or more text fields 126 and 128 which provide information to the user regarding the cause of the alarm and the status of the device. By clicking on specified areas of the icon 124, the user can obtain further information regarding the device for which an alarm is registered.

Another method for fault management in large communications networks is to use a so-called "trouble-ticketing" system. This system provides a number of tools that can be used by network users, administrators, and repair and maintenance personnel. The basic data structure, a "trouble-ticket", has a number of fields in which a user can enter data describing the parameters of an observed network fault. A trouble-ticket filled out by a user may then be transmitted by, for example, an electronic mail system to maintenance and repair personnel. A trouble-ticket describing a current network fault that needs to be acted on is called "an outstanding trouble-ticket". When the network fault has been corrected, the solution to the problem, typically called a "resolution" is entered into an appropriate data field in the trouble-ticket and the trouble-ticket is said to be completed. The system provides for storage of completed trouble-tickets in memory and thus a library of such tickets is created, allowing users, administrators, and maintenance and repair personnel to refer to the stored completed trouble-tickets for assistance in determining solutions to future network faults. An example of a trouble-ticketing system is the ACTION REQUEST system, developed by Remedy Corporation, Mountain View, Calif., and sold by Cabletron Systems, Inc., Rochester, N.H.

ARS Gateway™ is a network management application sold by Cabletron Systems, Inc. which receives fault information from the Spectrum™ system and automatically generates a trouble-ticket that may be processed by the ACTION REQUEST system. This system is further described in copending and commonly owned U.S. Ser. No. 08/023,972 filed Feb. 26, 1993 by Lundy Lewis, and entitled "Method and Apparatus For Resolving Faults In Communications Networks," and which is hereby incorporated by reference in its entirety.

The Spectrum™ system is described in U.S. Pat. No. 5,261,044 issued Nov. 9, 1993 to Roger Dev et al., which is hereby incorporated by reference in its entirety. The Spectrum™ network management system is commercially available and also described in various user manuals and literature available from Cabletron Systems, Inc., Rochester, N.H.

Other network management platforms and applications for the basic filtering of alarms which are commercially available include: (1) HP OpenView, 3000 Hanover Street, Palto, Calif. 94304; (2) LattisNet, SynOptics Communications, 4401 Great American Pkwy., Santa Clara, Calif. 95054; (3) IBM Netview/6000, IBM Corp., Old Orchard Road, Armonk, N.Y. 10504; and (4) SunNet Manager, SunConnect, 2550 Garcia Ave, Mountain View, Calif. 94043.

Unfortunately, in the prior art systems alarms can only be received from one network management server. Also there is no provision for applying the same policy-based filter to multiple network management applications.

Thus, it is an object of the present invention to provide greater control over which alarms get reported to network management applications and to provide a means to ensure consistency of reported alarms across multiple network management applications.

SUMMARY OF THE INVENTION

The present invention is directed to an apparatus and method of alarm notification which includes: (a) receiving alarms from multiple network management servers; (b) assigning policy-based filters to associated network management applications; and (c) applying the assigned policy-based filters to the alarms and for the alarms that pass the filters, generating an alarm notification forwarding the same to the associated network management applications.

In an embodiment described herein, a user designates a plurality of such filters, which constitute an alarm notification policy, to one or more associated network management applications. The policy-based filters are stored in a database, and a tag is assigned for identifying each filter. The same filters may be assigned to multiple applications.

In a further embodiment, the user may schedule the assignment of such policy-based filters to occur at a designated time in the future. For example, a user may pick a policy from a list of available policies to associate with a selected application, and then designate the frequency with which the policy is applied, e.g., once, hourly, daily, weekly or monthly.

Furthermore, the invention can be used in the same mode as similar tools in the prior art, i.e., with one alarm-forwarding component for each network management system/network management application pair, or alternatively as a single entity in a distributed network management environment.

These and other features of the present invention will be more fully described in the following detailed description and figures.

DETAILED DESCRIPTION

The present invention is directed to an alarm notification manager which receives alarms from multiple network management servers, allows an unlimited number of filters to be defined within one policy, allows policies to be named and stored in a database, allows policies to be scheduled for different times, and allows the same policy to be applied to one or more network management applications.

Figure 1:
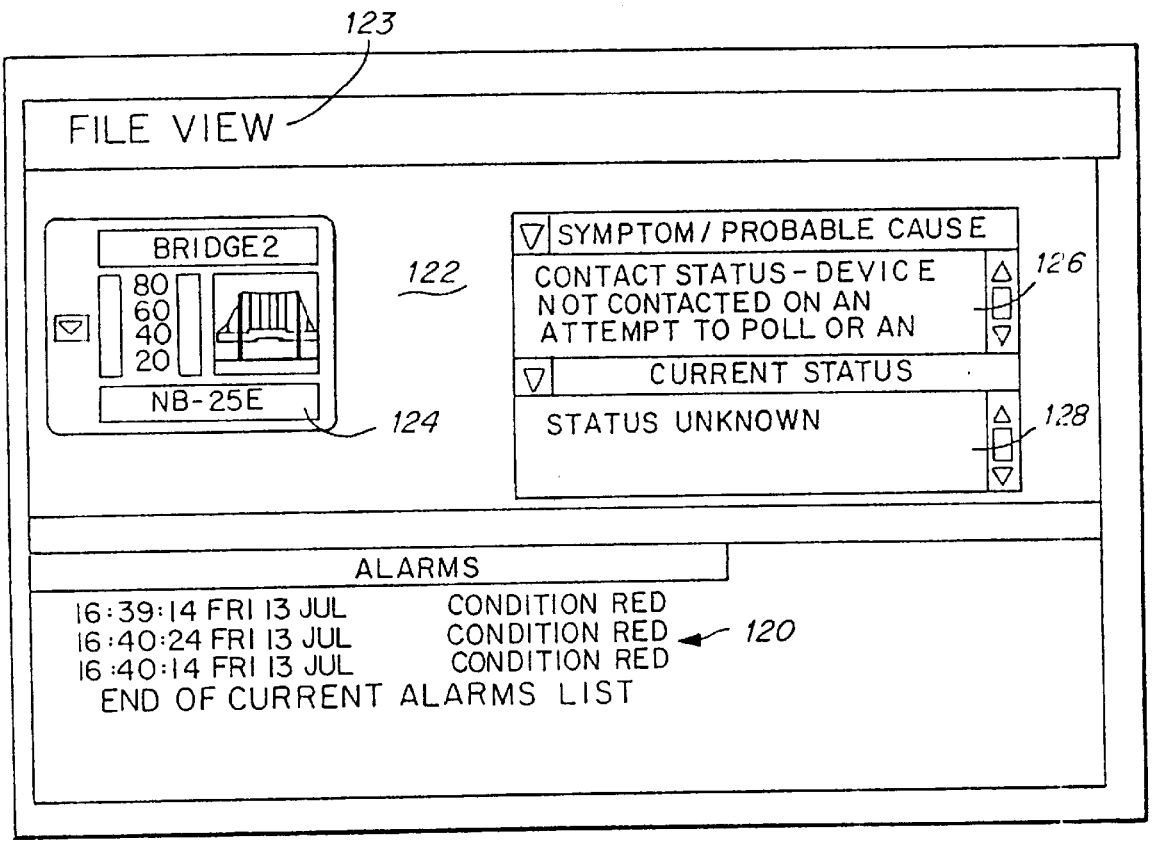
FIG. 1 is an example of an alarm log display provided by the prior art Spectrum™ network management system.
Figure 2:
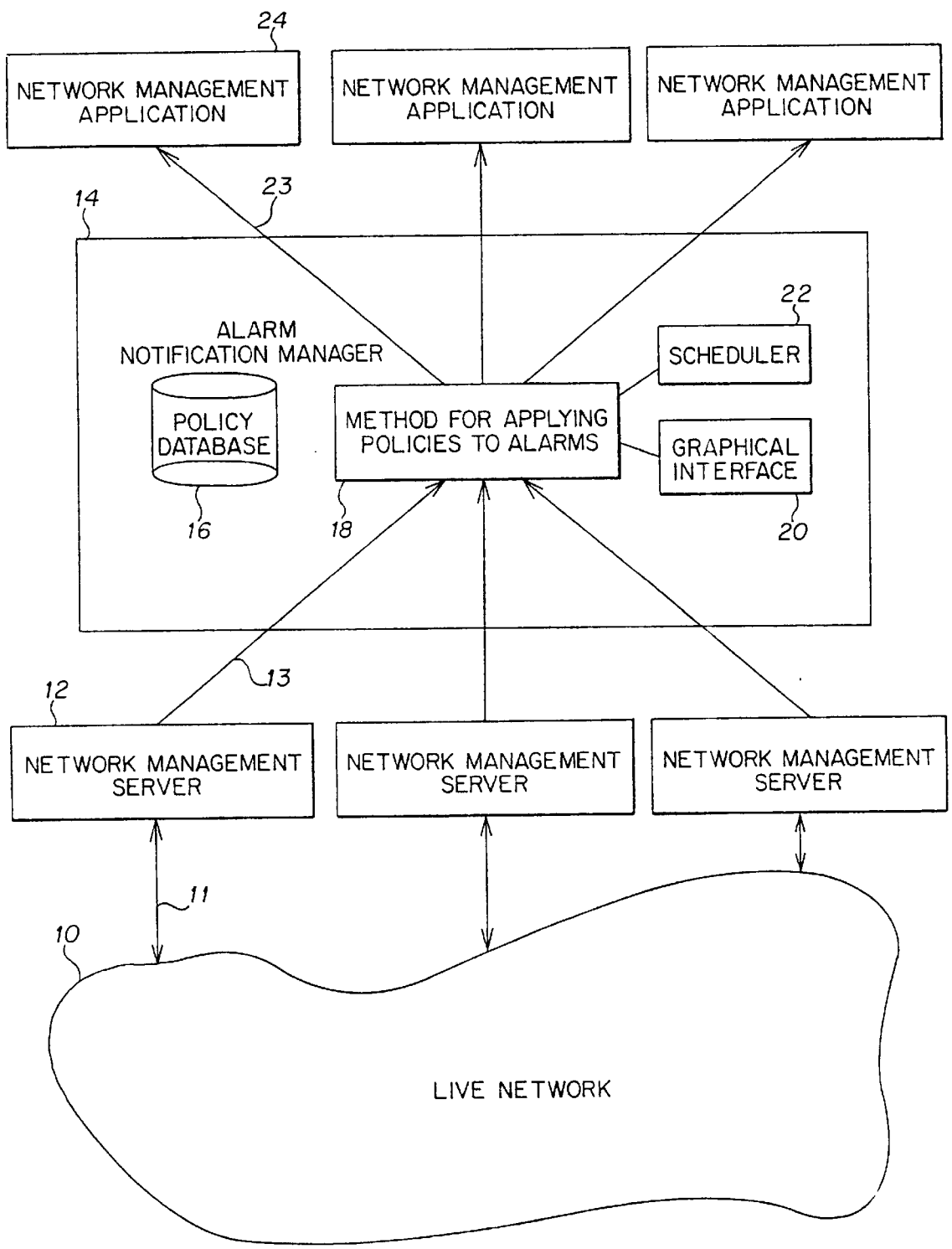
FIG. 2 is a block diagram of an alarm notification manager in accordance with the present invention, in use with multiple network management servers and multiple network management applications.

As illustrated in FIG. 2, a live network 10 is connected by links 11 to one or more network management servers 12 which monitor the network. The servers detect errors or faults on the network and send alarm information to the alarm notification manager 14 via links 13. The alarm notification manager includes a policy database 16, method for applying policies to alarms 18, graphical interface 20, and scheduler 22. The manager applies policy-based filters to the alarm messages received from the servers, and for those alarms which pass the filter criteria, an alarm message is sent to the appropriate network management application 24 via links 23.

In a specific embodiment described herein, a plurality of distributed SpectroServers™, part of the Spectrum™ system sold by Cabletron Systems, Inc., Rochester, N.H., are used to model the live network 10, and several Spectrum™ applications receive the filtered alarm messages from the manager 14. These components have been implemented in the object-oriented programming language C++. However, the invention is not tied to any particular language nor to any particular products used in network management.

The Spectrum™ Network Management System

An understanding of the present invention is furthered by an understanding of the model-based network management system known as Spectrum™, which is described in U.S. Pat. No. 5,261,044, issued Nov. 9, 1993 to R. Dev et al., and hereby incorporated by reference in its entirety. The Spectrum™ network management system is commercially available and also described in various user manuals and literature available from Cabletron Systems, Inc., Rochester, N.H.

In summary, Spectrum™ is a system for maintaining and processing information pertaining to the condition of the computer network and providing the same to a user, the network including a plurality of network entities such as computer devices and software applications being executed on such devices. The system includes a virtual network machine, comprising a programmed digital computer, wherein a program is implemented using an object-oriented programming language such as C++, Eiffel, SmallTalk, and Ada. The virtual network consists of interrelated intelligent models of network entities and relations between network entities, including means for acquiring network data pertaining to the condition of a network entity from the corresponding network entity. The virtual network further includes means for maintaining objects which include network data relating to the corresponding network entity and one or more inference handlers for processing the network data, the inference handlers being responsive to changes occurring in the same and/or a different object. The network data can then be transferred to a user interface coupled to the virtual network machine, for supplying the network data to a user.

Thus, the models are implemented as software "objects" containing both "data" (attributes) relating to the corresponding network entity and one or more "inference handlers" (functions) for processing the data. See Grady Booch, "Object-Oriented Analysis And Design, With Applications," 2nd Edition, Benjamin/Cummings Publishing Co., Redwood City, Calif., Chapter 2, 1994. The inference handlers are initiated by predetermined virtual network events, such as a change in specified network data in the same model, a change in specified network data in a different model, and predefined events or changes in models or model relations. Information pertaining to the condition of the network entity can be obtained from the network entity by polling the same, can be automatically received from the network entity (without polling), or can be inferred from data contained in other models. An alarm condition may be generated when the network data meets a predetermined criteria. Events, alarms and statistical information from the virtual network are stored in a database and are selectively displayed for the user.

The data in the Spectrum™ database may be used for generating topological displays of the network, showing hierarchial relationships between network devices, isolating a network fault, and reviewing statistical information.

Spectrum™ allows for collective management of autonomous local area networks (LANs), with equipment from different vendors. It complies with the current Simple Network Management Protocol (SNMP) standards, and can also accommodate other standard and proprietary protocols. The virtual network machine preprocesses the raw information coming from the network devices in order to construct a model of the network's current status and performance characteristics. Network elements that cannot be directly communicated with (e.g., cables and buildings) can infer their status from the status of the devices connected to (or contained within) them. The virtual network machine provides a consistent interface for management applications to access any of the information in the model and thereby provides these applications with a unified view of the network.

Spectrum's™ associated SpectroGRAPH™ user interface provides a highly graphical multi-perspective view into the network model. SpectroGRAPH™ enables the user to navigate through a landscape in which cables, networks, local area networks and even rooms show up as icons, and which icons indicate the health and performance characteristics of those elements. These icons can be further queried for additional information. SpectroGRAPH™'s main function is to visually present to the user the model within the virtual network machine. It allows the user to navigate freely within the network model, only limited by the access rights assigned by the network administrator. The information can be accessed at varying degrees of detail, from a macro overview, to the devices and cables which connect them. In addition to its navigation functions, SpectroGRAPH™ provides an alarm management facility, an event log window, a reporting facility, a find facility, and other features.

The above description of the Spectrum™ system provides a context for an understanding of the present invention.

The Alarm Notification Manager

The following definitions are helpful to an understanding of the present invention:

| | |
|---|---|
| SANM | SPECTRUM ™ Alarm Notification Manager |
| Policy | A set of criteria which a given alarm must satisfy in order to be passed to the application with which the policy is associated. A policy may consist of one or more filters. |
| Filter | A set of filter parameters and associated filter values. Multiple filters define multiple sets of values for the filter parameters. |
| Filter Parameter | A data type such as model name or IP subnet for which the user can specify a value or list of values. SANM provides the user with a fixed list of filter parameters. |
| Association | When the user associates a policy with an application, he is specifying the filter criteria that SANM should apply the alarms it sends to the application. |

A filter consists of a list of filter parameters and a list of associated filter values. A user (of a network management application) specifies the value(s) that each filter parameter can take in order for a given alarm to pass the filter criteria. The following is a list of representative filter parameters:

model name
model type name
device IP subnet
device location
alarm severity
alarm age
SpectroSERVER host name
landscape name
alarm cause The value for each of the above filter parameters would be received from Spectrum™, except for the alarm age parameter. The alarm age parameter is used internally by SANM and specifies the length of time that it should hold an alarm before sending it to an application. If the alarm is cleared by Spectrum™ during this time, it is not sent to the application. This feature may be used to filter out transient alarms.

Each filter value also has a corresponding flag which indicates whether it should be negated. For example, if the negate flag is set for a model type name value of Hub_CSI_IRM3, this filter value states that all alarms for models NOT of type Hub_CSI_IRM3 should pass.

More complex filtering can be achieved by defining multiple filters within a policy. Each filter specifies a separate set of filter values.

SANM performs a logical AND of all the filter criteria within a filter and performs a logical OR between all filters within a policy.

For example, a policy contains two filters as follows:

Filter 1
Model Type: Rtr_Cisco
Landscape: wiz
Filter 2
Model Type: Rtr_Wellfleet
Landscape: brat
SANM would apply this policy to a given alarm as follows:

```
IF the alarm has:
    model type Rtr_Cisco AND landscape wiz
    OR
    model type Rtr_Wellfleet AND landscape brat
THEN send the alarm to the application.
```

Each filter also contains a filter tag, which is a text string that the user enters. This tag, which is included in the alarm notification, identifies which filter(s) passed and can be used by an application to perform routing of alarms.

For example, a different user name can be entered in the filter tag field of each filter, so that if the criteria in one filter pass, the application will notify a particular user, whereas if the criteria in another filter pass, the application will notify a different user. If multiple filters pass, a list of corresponding filter tags is sent in the alarm notification.

Figure 3:
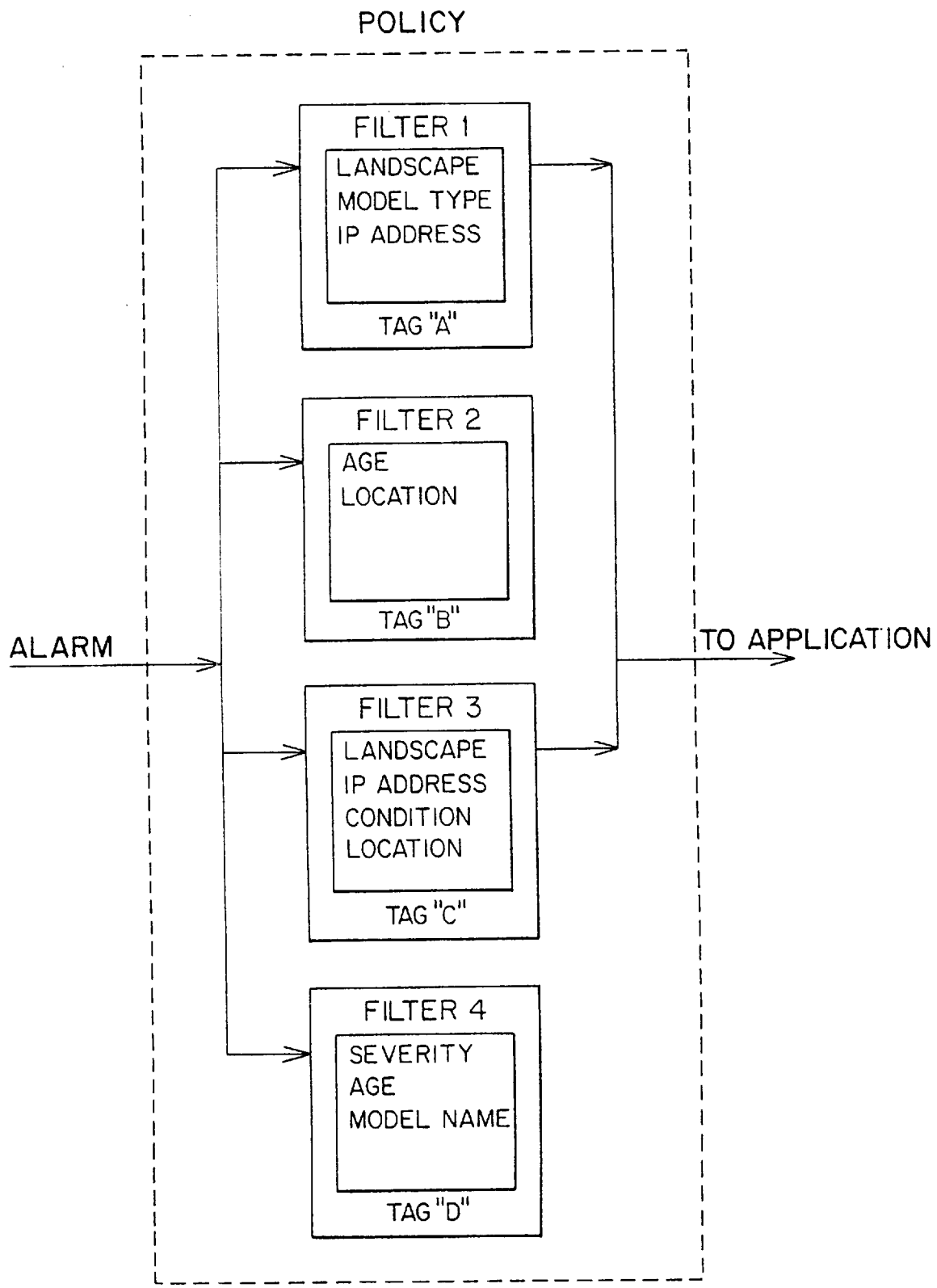
FIG. 3 is a flow chart illustrating the application of policy-based filters to an alarm, and forwarding of the alarm which passes the filters to an application in accordance with this invention.

Another example of the SANM filtering mechanism is shown in FIG. 3. In this figure, the criteria listed within each filter are the criteria for which values have been specified by the user. It can be seen from this example that all filters are applied in parallel to a given alarm (i.e., a logical OR is performed between filters). However, all criteria within a given filter must be satisfied for the alarm to pass the filter (i.e., a logical AND is performed between the criteria within a given filter). Since, in this example, the alarm passes the criteria in filters 1 and 3, an alarm notification containing filter tags "A" and "C" is sent to the application.

Policies and the associations between policies and applications are stored in the SPECTRUM™ database. This means that the same policies are available to any client machine running SANM. It also means that the policy names contained in event messages logged by SANM have significance to all client machines using the same SPECTRUM™ database.

1.0 Alarm Notification

After an application has registered with SANM to receive alarms, an alarm notification is sent to that application each time an alarm is received from SPECTRUM™ that passes the criteria specified in the policy associated with that application. The information contained in each alarm notification consists of the real-time values of each filter parameters, plus the values of the following parameters:

model handle
model type handle
model condition value
model security string
alarm ID
alarm time
alarm probable cause
alarm status
event message associated with alarm
assigned repair person
user-clearable flag One exception to this is that an IP subnet address may be specified as a filter criterion, but the full IP address of the device that created the alarm is passed in the alarm notification.

A notification that an alarm has been cleared or updated is sent to an application when SANM receives such a notification from SPECTRUM™, but only if the alarm which is being cleared or updated was initially sent to the application when it occurred (i.e., it passed the filter criteria for that application).

2.0 Configuration Tool

The SANM Configuration Tool enables the user to define Alarm Notification Policies and to associate these policies with the applications that use SANM.

The Configuration Tool is invoked by selecting Alarm Notification Manager from the asterisk menu of SpectroGRAPH™.

2.1 Associations Window

Figure 4:
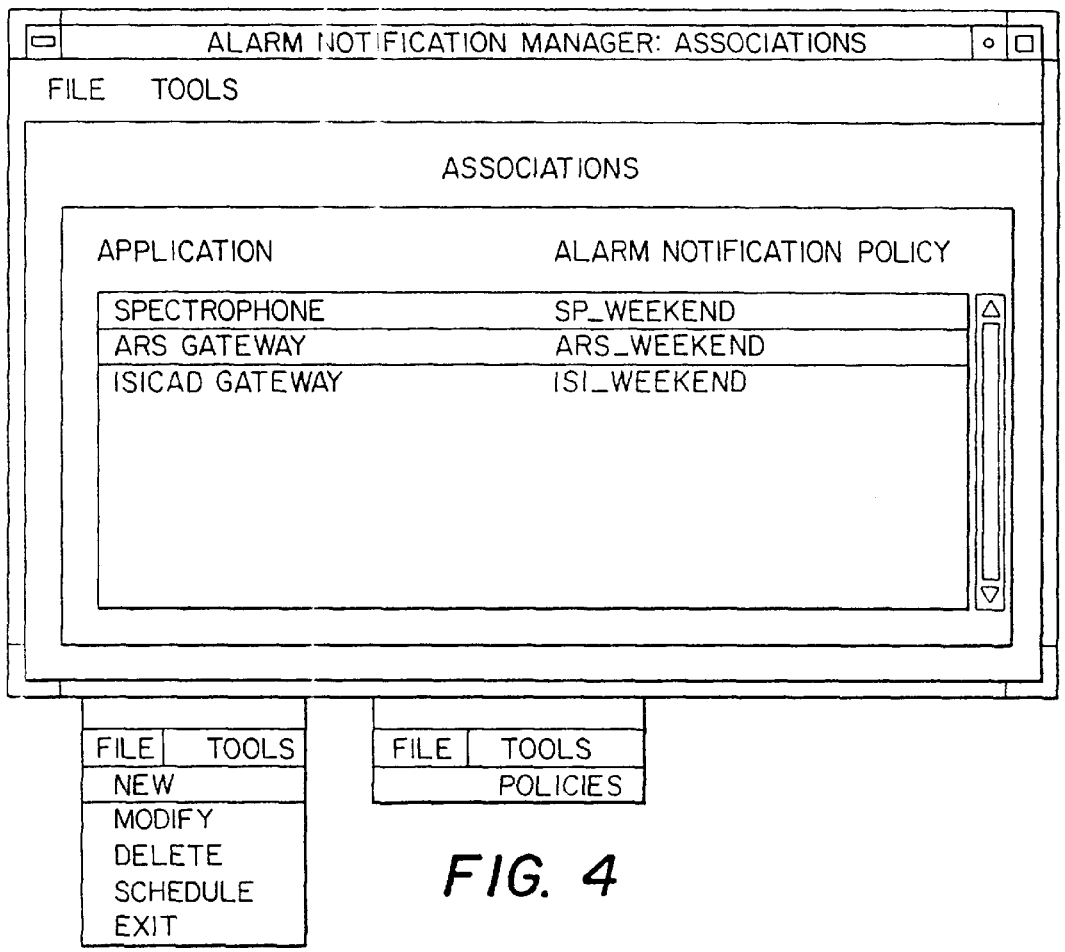
FIG. 4 is an example of an Associations window display of the alarm notification manager.

When the Configuration Tool is invoked, the first window to appear is the Associations window, shown in FIG. 4. This window displays a list of the currently defined SANM applications and the policy that is associated with each of them.

A new association is created by selecting New from the File menu. This brings up the New Association window shown in FIG. 5.

An existing association is modified by selecting the association and then selecting Modify from the File menu. This brings up the Modify Association window shown in FIG. 6.

An existing association is deleted by selecting the association and then selecting Delete from the File menu. The selected association is deleted after the user confirms the operation in a Confirmation Dialog window (not shown).

The modification of an existing association can be scheduled by selecting the association and then selecting Schedule from the File menu. This brings up the Scheduler window shown in FIG. 7.

All currently defined policies can be viewed by selecting Policies from the Tools menu. This brings up the Policies window shown in FIG. 8.

2.2 New Association Window

Figure 5:
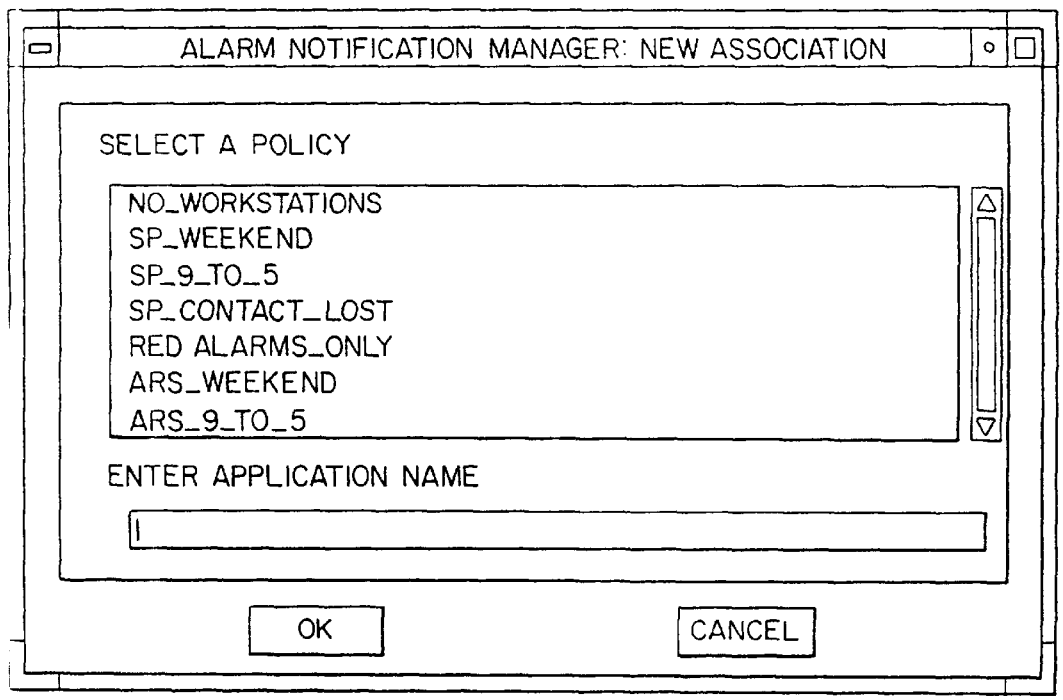
FIG. 5 is an example of a New Association window display of the alarm notification manager.

The New Association Window is illustrated in FIG. 5. In this window, a policy is selected from the list of available policies and the application name is entered. When OK is pressed, the window disappears and the new association appears in the Associations window (FIG. 4).

2.3 Modify Association Window

Figure 6:
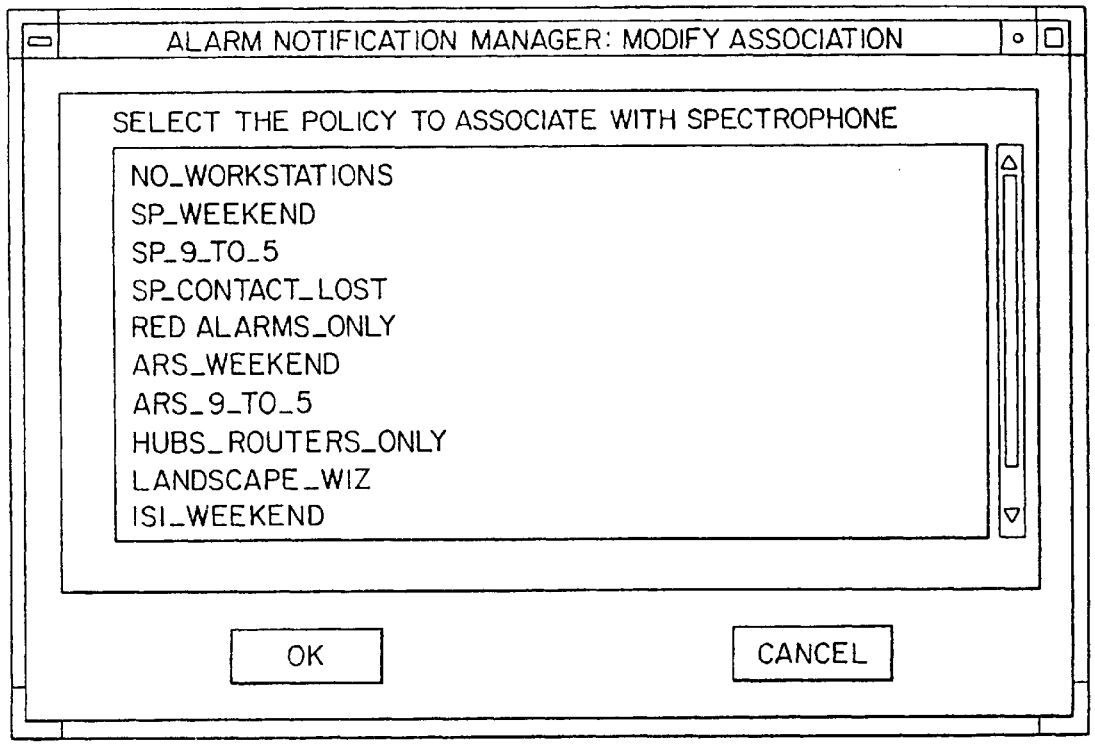
FIG. 6 is an example of a Modified Association window display for the alarm notification manager.

The Modify Association window is illustrated in FIG. 6. In this window, the user picks a policy from the list of available policies to associate with the selected application (SpectroPHONE™ in this example, available from Cabletron Systems, Inc.). Pressing OK makes this window disappear and the modified association is displayed in the Associations window (FIG. 4).

2.4 Scheduler Window

Figure 7:
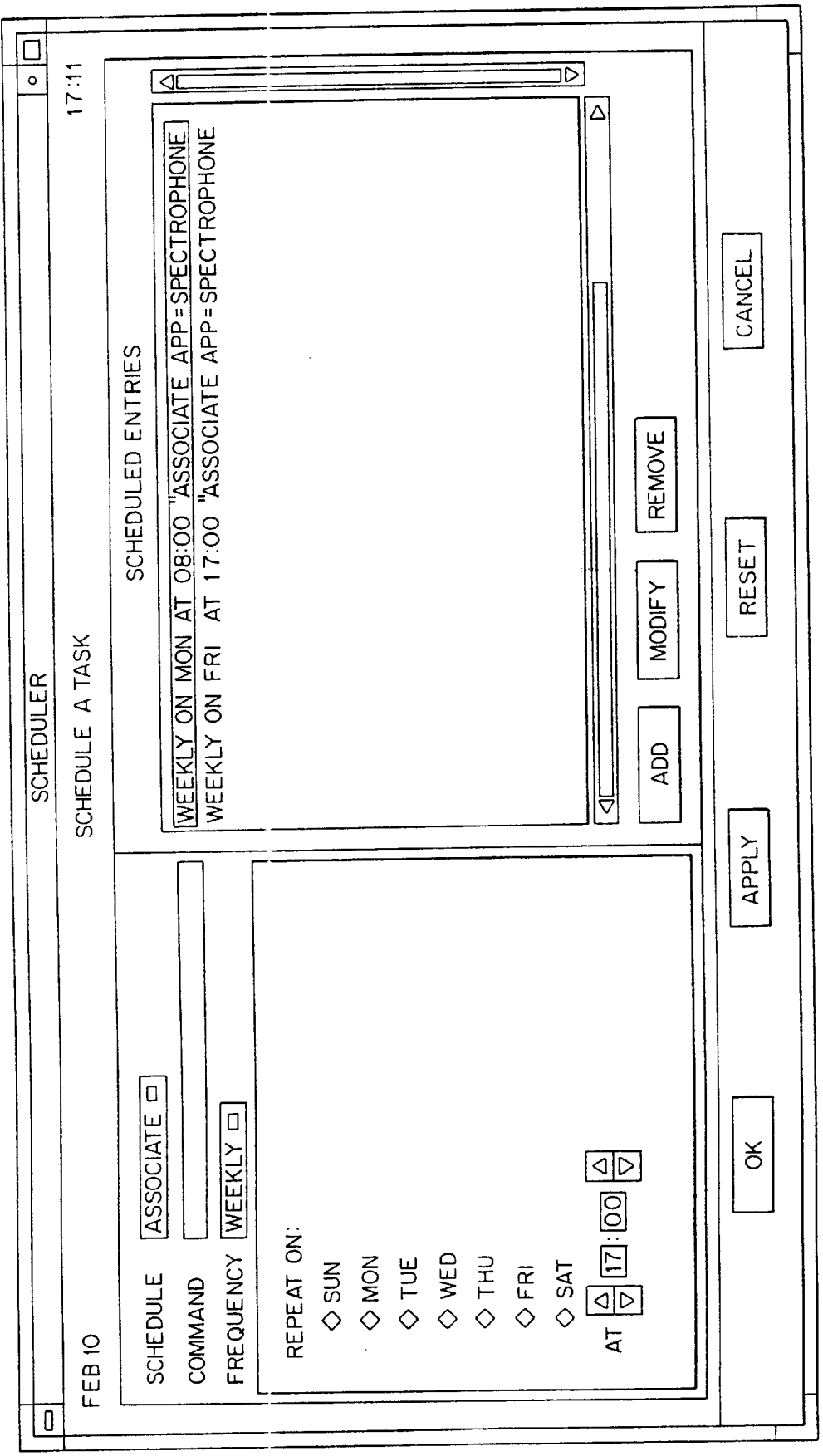
FIG. 7 is an example of a Scheduler window display for the alarm notification manager.

The Scheduler window is illustrated in FIG. 7. Pressing the Associate button brings up the Modify Association window illustrated in FIG. 6. In the Modify Association window, the user picks a policy from the list of available policies to associate with the selected application (SpectroPHONE™ in this example). In the Scheduler window, the user then presses the Frequency button to specify the frequency of the association. The Frequency options are: Once, Hourly, Daily, Weekly and Monthly. The information in the area below the Frequency button changes depending on what frequency option is selected as follows:

- The Once option allows the user to specify the month, day and start-time.
- The Hourly option allows the user to specify the number of minutes after each hour.
- The Daily option allows the user to specify the time.
- The Weekly option allows the user to specify the day of the week and the time.
- The Monthly option allows the user to specify the day of the month and the time.

Once the desired scheduling options have been selected, pressing the Add button inserts the scheduling information into the Scheduled Entries portion of the window. Further entries can be added by repeating the previous steps. Entries can be modified and removed by selecting them and using the Modify and Remove buttons.

2.5 Policies Window

Figure 8:
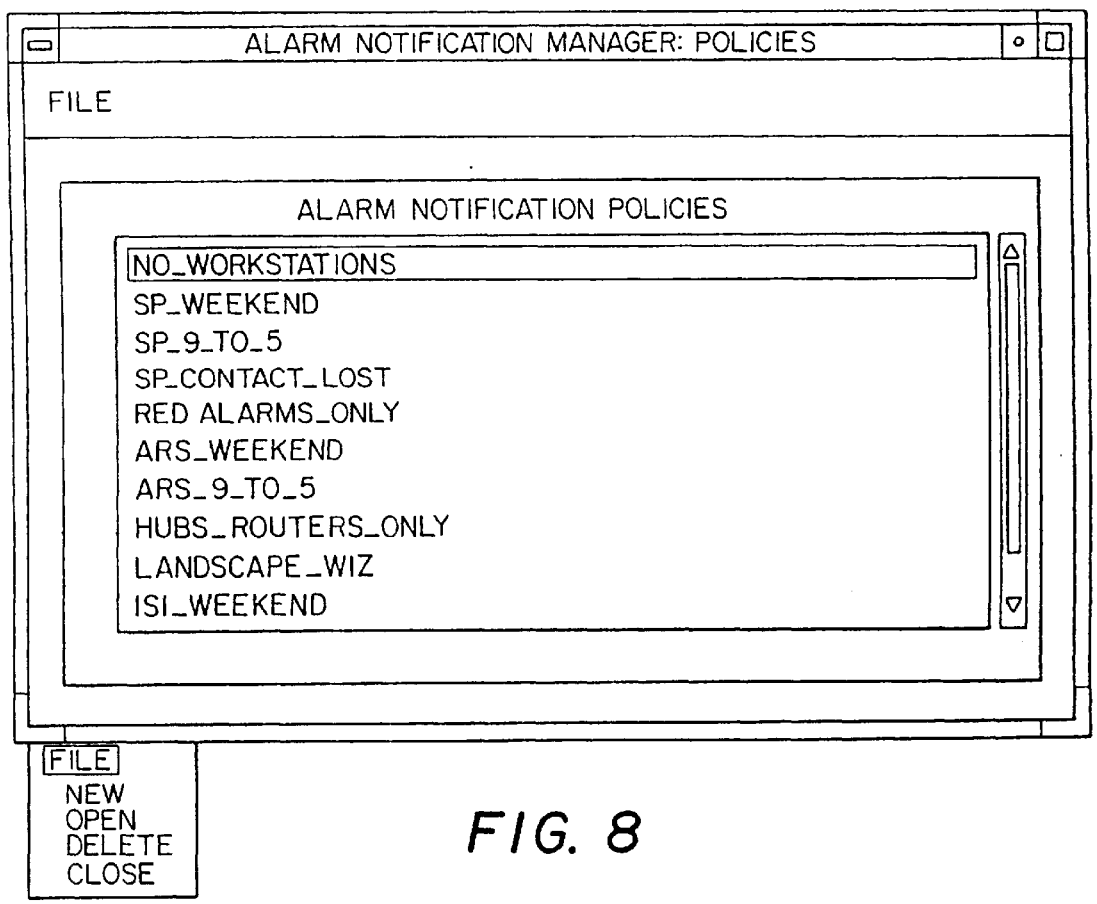
FIG. 8 is an example of a Policies window display for the alarm notification manager.

The Policies Window is illustrated in FIG. 8. This window shows all currently defined policies.

A new policy is created by selecting New from the File menu. This causes the New Policy window (FIG. 12) to appear.

An existing policy is viewed and modified by selecting the policy and then selecting Open from the File menu. This causes the Open Policy window (FIG. 9) to appear.

An existing policy is deleted by selecting the policy and then selecting Delete from the File menu. The selected policy is deleted after the user confirms the operation in a Confirmation Dialog window (not shown).

2.6 Open Policy Window

Figure 9:
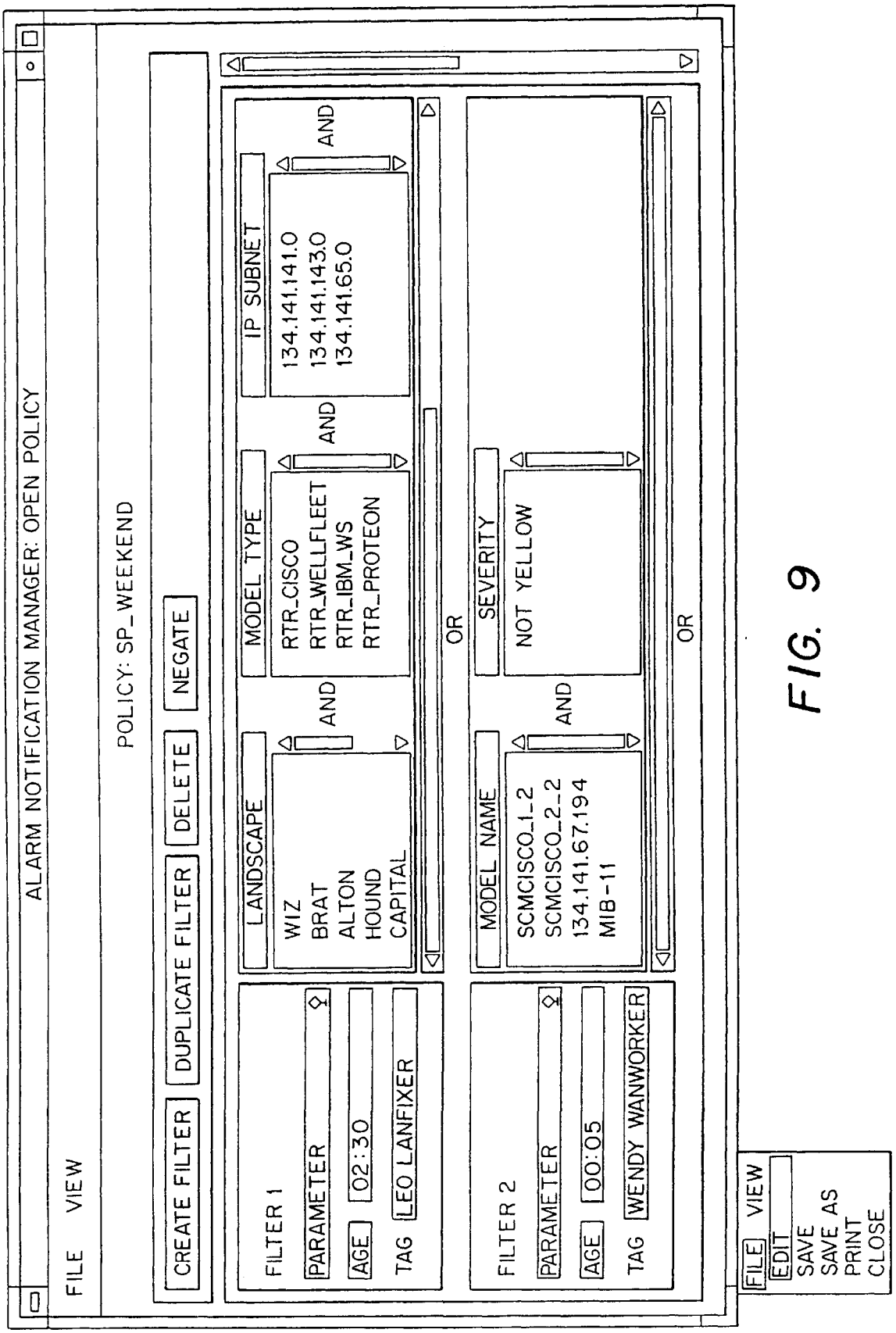
FIG. 9 is an example of an Open Policy window display for the alarm notification manager.

The Open Policy window is illustrated in FIG. 9. This window shows all the filters that make up the policy. In the example shown in FIG. 9, Filters 1 and 2 are visible, but subsequent filters can be viewed using the scrollbar on the right of the window. Similarly, the other filter parameters for Filter 1 and their associated values can be viewed using the scrollbar below the Filter 1 filter parameters.

Figure 10:
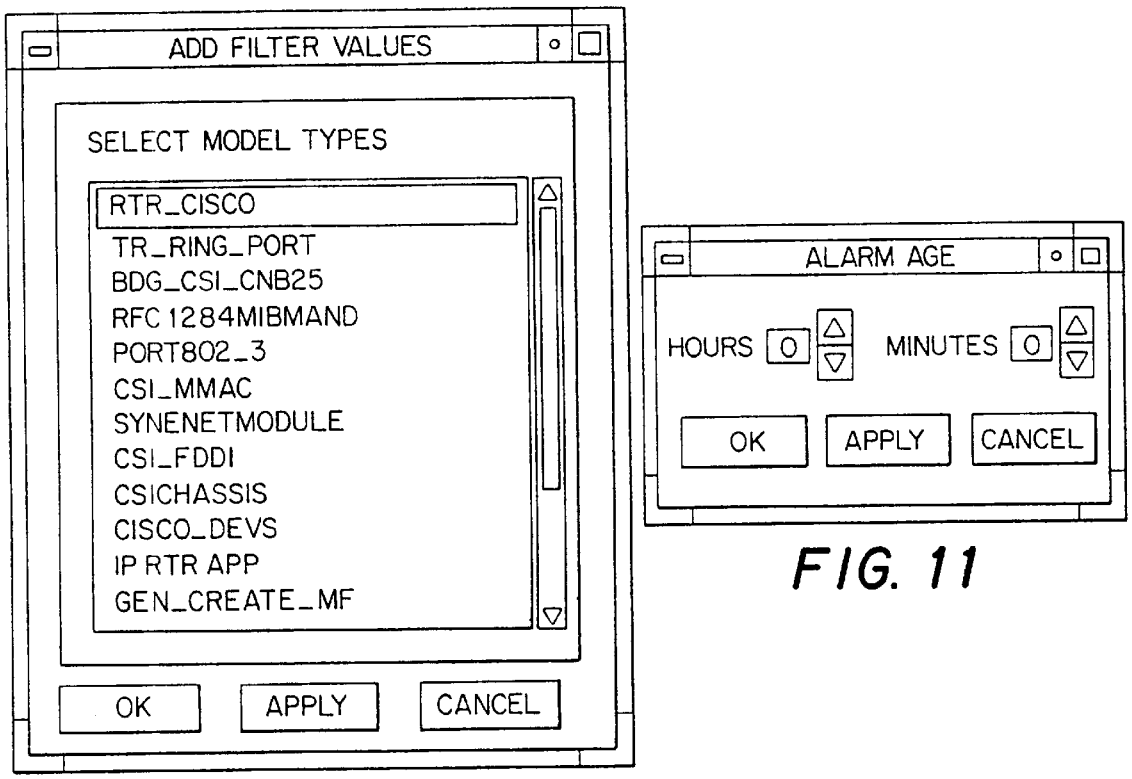
FIG. 10 is an example of an Add Filter Values window display for the alarm notification manager.

To modify the displayed policy, Edit must be selected from the File menu. The View item in the menu bar then becomes Edit. Once in Edit mode, multiple values for a particular filter parameter can be deleted or negated by selecting the values and pressing the Delete or Negate button. Values can be added for a particular filter parameter by pressing the filter parameter button (e.g. Landscape or Model Type). This brings up a separate window containing a list of available values from which multiple values can be selected. An example of this window is shown in FIG. 10.

Filter parameters may be added to a filter by pressing the Parameter button within the filter. A pop-up menu appears containing all eight filter parameters. However, those filter parameters which are already present in the filter are greyed-out and cannot be selected. Selecting one of the available filter parameters from this menu causes the new filter parameter and associated value box to appear in the filter.

Figure 11:
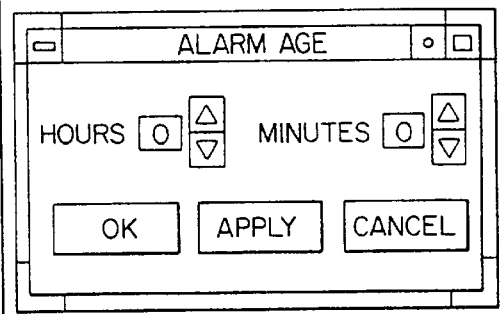
FIG. 11 is an example of an Alarm Age window display for the alarm notification manager.

The alarm age for a particular filter can be modified by pressing the Age button in the Open Policy window. This brings up the Alarm Age window shown in FIG. 11. The values for the Hours and Minutes fields initially contain the values from the Age text field in the Open Policy window. These values can be modified using the up and down arrow buttons for hours and minutes.

A filter tag can be modified in the Open Policy window by typing directly into the Tag text field of a filter.

A new filter may be added to the policy displayed in the Open Policy window by pressing the Create Filter button. This will cause a new filter with no filter parameters to be added to the end of the list of filters.

An existing filter may also be duplicated. To do this the filter to be duplicated must first be selected by clicking within the filter label field (e.g. the area around the label Filter 2) and then pressing the Duplicate Filter button. Doing this causes a new filter, containing the same filter parameters and values as the selected filter, to be added to the end of the filter list. This new filter can then be modified.

After modifying a policy, Save can be selected from the File menu to save the modified policy under its existing name, or Save As can be selected to save the modified policy under a different name.

The information in the Open Policy window can be printed by selecting Print from the File menu.

2.7 New Policy Window

Figure 12:
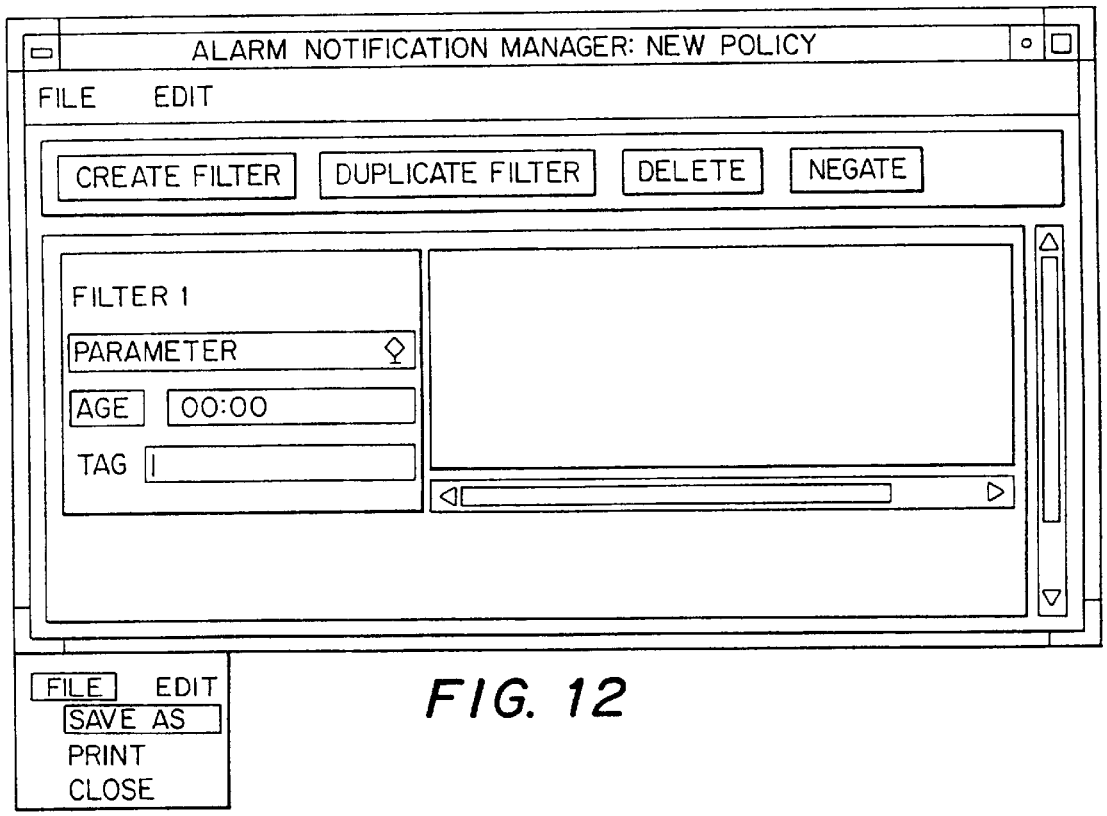
FIG. 12 is an example of a New Policy window display for the alarm notification manager.

The New Policy Window is illustrated in FIG. 12. The operations that can be performed in the New Policy window are the same as those performed in the Open Policy window (FIG. 9). No filter parameters initially appear within Filter 1, therefore the first operation that needs to be performed is to select a filter parameter by pressing the Parameter button within Filter 1. All filter parameters are available from the pop-up menu at this point because the filter does not yet contain any filter parameters.

A new policy is saved by selecting Save As from the File menu and entering the name for the policy in a dialog box.

3.0 Integration of SANM and Application

A developer would use the following interface to integrate an application written in C or C++ with the Spectrum™ alarm mechanism.

Figure 13:
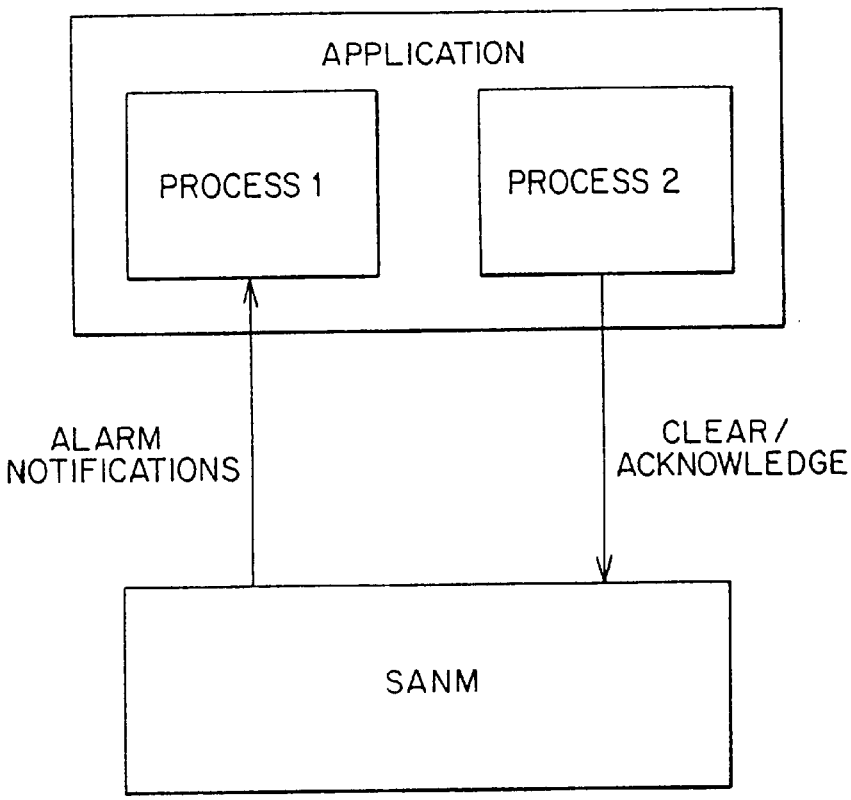
FIG. 13 is a block diagram illustrating two separate processes between the network management application and the alarm notification manager.

An application using SANM to receive alarm notifications and to clear/acknowledge alarms requires two separate processes, as illustrated in FIG. 13.

As an example of how these two separate processes would be used in an application, the ARS Gateway™ product would use Process 1 to receive filtered alarms from SANM, format them into Trouble Tickets and put them into the ARS Database. Process 2 would be used when a user viewing a particular Trouble Ticket pressed a clear or acknowledge button in the Trouble Ticket.

Two different programming paradigms are required for the two application processes that use SANM:

For the process that receives alarm notifications from SANM, an asynchronous callback paradigm is used. This means that when the application code registers with SANM to receive alarms, it hands program control over to SANM. When SANM needs to send an alarm notification to the application, the application receives a callback from SANM. This process is terminated by sending it a TERM (terminate, 15) signal.

For the process that clears or acknowledges alarms, however, a synchronous paradigm is used. This means that the application code in this process has program control. When this application code makes a call to the SANM API to clear or acknowledge an alarm, the call blocks the application until it is finished.

3.1 Definitions and Data Structures

All definitions and data structures are contained in the SANM header file sanm.h and are described below.

The prototype for the application's callback functions is defined as follows: typedef void (*SANMCb) (struct SANM_Alarm_Notify *);

All the data in an alarm notification is contained in the SANM_Alarm_Notify structure, which is defined as follows:

```
struct SANM_Alarm_Notify{
    char            *model_name;
    SANMUlong       model_handle;
    char            *model_type_name;
    SANMUlong       model_type_handle;
    int             condition_value;
    char            *security_string;
    SANMUlong       alarm_ID;
    SANMTimestamp   alarm_time;
    SANMUlong       cause_code;
    char            *probable_cause;
    char            *alarm_status;
    char            *event_message;
    char            *repair_person;
    char            *IP_address;
    char            *location;
    SANMUlong       severity;
    SANMUlong       alarm_age;
    char            *SpectroSERVER_host;
    char            *landscape;
    SANMBoolean     user_clearable;
    char            *filter_tag;
};
```

All errors and warnings are defined in the enumeration SANM_error as follows:

```
enum SANM_error
}
    SANM_RETURN_OK,
    SANM_INVALID_ALARM,
    SANM_INVALID_LANDSCAPE,
    SANM_ALARM_NOT_CLEARABLE,
    SANM_REGISTER_ERROR
}
```

3.2 Functions

The functions that make up the SANM C/C++ API are described in the following sections in manual page format.

3.2.1 SANMInit

```
NAME
    SANMInit - initialize interaction with SANM
SYNOPSIS
    #include "sanm.h"
    SANM_error SANMInit ( char *application_name,
                          SANMBoolean rcv_or_clr );
```

Description

SANMInit serves to initialize the program for interaction with SANM. This function should be called from within both application processes before any other function in the SANM API.

| INPUT ARGUMENTS | |
|---|---|
| application_name | the name which must be used by the user to identify th:is application when using the Configuration Tool to associate a policy with it. |
| rev_or_clr | a flag which indicates whether this process is going to receive alarm notifications or clear/ acknowledge alarms. The flag can take either of the following two values:<br>SANM_RCV_ALARMS<br>SANM_CLR_ALARMS |
| RETURN VALUES | |
| status | The return value will be one of the following values:<br>SANM_RETURN_OK |

3.2.2 SANMRegister

```
NAME
    SANMRegister - register with SANM
SYNOPSIS
    #include ".sanm.h"
    SANM_error SANMRegister ( SANMCb set_cb,
                              SANMCb clear_cb,
                              SANMCb update_cb );
```

Description

SANMRegister registers the application to receive alarm notifications from SANM. By calling this function, the application hands program control over to SANM until one of the application's callback functions is called.

| INPUT ARGUMENTS | |
|---|---|
| set_cb | the name of the function that SANM will call in order to send an alarm notification for a new alarm. All applications must pass a valid function for this parameter. |
| clear_cb | the name of the function that SANM will call in order to send an alarm notification for a cleared alarm. This parameter can be NULL if the application does not want to receive notifications for cleared alarms. |
| update_cb | the name of the function that SANM will call in order to send an alarm notification for an |

| | |
|---|---|
| | updated alarm. This parameter can be NULL if the application does not want to receive notifications for updated alarms. |
| RETURN VALUES | |
| status | In normal operation, this function will never return. However, if it fails, one of the following errors will be returned: SANM_REGISTER_ERROR |

3.2.3 SANMClear

```
NAME
    SANMClear - clear an alarm
SYNOPSIS
    #include "sanm.h"
    SANM_error SANMClear ( SANMUlong alarm_ID,
                           char *landscape );
```

Description

SANMClear clears an alarm in SPECTRUM. An application can only clear alarms for which it received notifications from SANM. Also, the user_clearable flag must have been set to CLEARABLE in the alarm notification

| | |
|---|---|
| INPUT ARGUMENTS | |
| alarm-ID | the ID of the alarm to be cleared |
| landscape | the landscape that generated the alarm |
| RETURN VALUES | |
| status | The return value will be one of the following values: SANM_RETURN_OK SANM_INVALID_ALARM SANM_INVALID_LANDSCAPE SANM_ALARM_NOT_CLEARABLE |

3.2.4 SANMack

```
NAME
    SANMAck - acknowledge an alarm
SYNOPSIS
    #include "sanm.h"
    SANM_error SANMAck ( SANMUlong alarm_ID,
                         char *landscape );
```

Description

SANMAck acknowledges an alarm in SPECTRUM. An application can only acknowledge alarms for which it received notifications from SANM.

| | |
|---|---|
| INPUT ARGUMENTS | |
| alarm_ID | the ID of the alarm to be acknowledged |
| landscape | the landscape that generated the alarm |
| RETURN VALUES | |
| status | The return value will be one of the following values: SANM_RETURN_OK |

| | |
|---|---|
| | SANM_INVALID_ALARM SANM_INVALID_LANDSCAPE |

Figure 14:
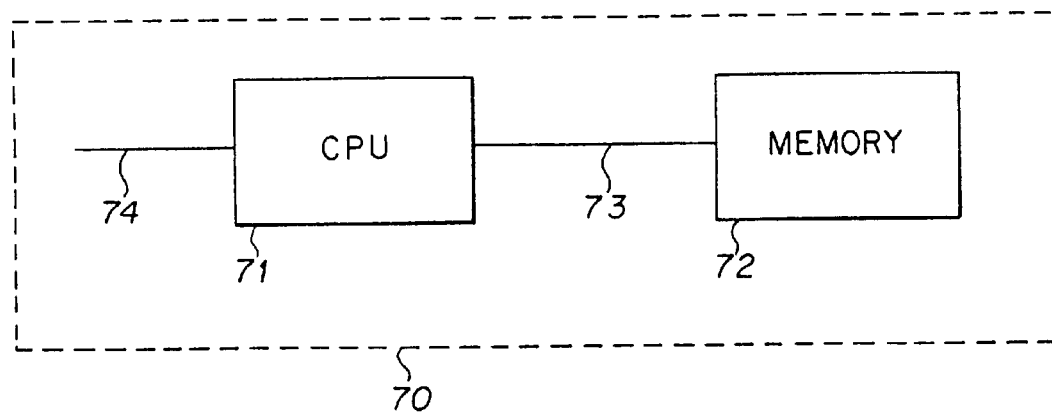
FIG. 14 is a block diagram illustrating a central processing unit and memory for use in this invention.

The present embodiments may be implemented in a general purpose computer 70 as shown in FIG. 14. The general purpose computer may include a computer processing unit (CPU) 71, memory 72, a processing bus 73 by which the CPU can access the memory, and interface 74 to the rest of the alarm notification manager.

In alternative embodiments, the invention may be a computer apparatus which performs the functions of any of the previous embodiments. Alternatively, the invention may be a memory, such as a floppy disk, compact disk, or hard drive, that contains the computer program or data structure, for providing to a general purpose computer instructions and data for carrying out the functions of the previous embodiment.

Having thus described certain particular embodiments of the invention, various modifications will readily occur to those skilled in the art which are intended to be within the scope of this invention. Accordingly, the foregoing description is by way of example only, and not intended to be limiting.

What is claimed is:

1. A method of alarm notification comprising the steps of:
   (a) receiving alarms from multiple network management servers;
   (b) assigning policy-based filters to associated network management applications; and
   (c) applying the assigned policy-based filters to the alarms and for the alarms which pass the filters, generating an alarm notification and forwarding the same to the associated network management application.

2. The method of claim 1, wherein:
   the assigning step includes assigning a plurality of filters comprising a policy to the associated network management application.

3. The method of claim 2, wherein:
   each filter comprises at least one filter parameter; and
   the applying step comprises performing a logical AND of all parameters within one filter and performing a logical OR between all filters within one policy.

4. The method of claim 3, wherein:
   the generating step includes specifying real-time values of each filter parameter in the alarm notification.

5. The method of claim 2, wherein:
   the assigning step includes storing a policy name and the associated applications in a database accessible to all servers.

6. The method of claim 1, wherein:
   the assigning step includes assigning a tag to each filter.

7. The method of claim 6, wherein:
   the generating step includes specifying the tag for the filter which the alarm passed in the alarm notification.

8. The method of claim 1, wherein:
   the assigning step includes storing the filters in a database.

9. The method of claim 1, wherein:
   the generating step further includes specifying a user name in the alarm notification to enable the application which receives the alarm notification to notify a user having the specified user name.

10. The method of claim 1, wherein:

the assigning step includes scheduling the assigning to occur at a specified time.

11. The method of claim 1, further comprising:

(d) following resolution of an alarm, forwarding an alarm clear message to the associated network management application.

12. The method of claim 1, wherein:

the assigning step includes assigning the same filters to multiple associated network management applications.

13. The method of claim 1, wherein:

the assigning step is performed by a user via a graphical user interface.

14. The method of claim 1, wherein:

the generating step includes generating an alarm notification which contains information about the device which generated the alarm.

15. The method of claim 1, further comprising:

one or more of the network management applications generating an alarm clear message and forwarding the same to the network management server which generated the alarm.

16. Apparatus for alarm notification comprising:

a database of policy-based filters;

a user interface for assigning policy-based filters to associated network management applications;

a processor and a memory device containing a program of instructions for the processor which instructions include:

means for receiving alarms from a plurality of network management servers;

means for applying policy-based filters to the alarms and generating an alarm notification for those alarms which pass the filters; and means for forwarding the alarm notification to the associated network management applications.

17. The apparatus of claim 16, wherein the user interface comprises means for assigning a tag to each filter.

18. The apparatus of claim 16, wherein the associated network management applications have models of network entities and means for updating the models upon receipt of the alarm notification.

19. The apparatus of claim 16, wherein the generating means includes means for specifying realtime values of each filter parameter in the alarm notification.

20. The apparatus of claim 16, wherein the user interface includes means for storing a policy name and the associated application in a database accessible to all servers.

* * * * *